(12) United States Patent
Kim et al.

(10) Patent No.: US 11,764,404 B2
(45) Date of Patent: Sep. 19, 2023

(54) ELECTROLYTE FOR LITHIUM SECONDARY BATTERY AND LITHIUM SECONDARY BATTERY COMPRISING SAME

(71) Applicants: HYUNDAI MOTOR COMPANY, Seoul (KR); KIA CORPORATION, Seoul (KR); The Industry & Academic Cooperation in Chungnam National University (IAC), Daejeon (KR)

(72) Inventors: Ko Eun Kim, Cheongju-si (KR); Seung Min Oh, Incheon (KR); Yoon Sung Lee, Suwon-si (KR); Jun Ki Rhee, Suwon-si (KR); Sung Ho Ban, Hwaseong-si (KR); Seung Wan Song, Sejong-si (KR); Gyeong Jun Chung, Daejeon (KR)

(73) Assignees: HYUNDAI MOTOR COMPANY, Seoul (KR); KIA CORPORATION, Seoul (KR); The Industry & Academic Cooperation in Chungnam National University (IAC), Daejeon (KR)

( * ) Notice: Subject to any disclaimer, the term of this patent is extended or adjusted under 35 U.S.C. 154(b) by 169 days.

(21) Appl. No.: 17/338,084

(22) Filed: Jun. 3, 2021

(65) Prior Publication Data
US 2022/0115702 A1 Apr. 14, 2022

(30) Foreign Application Priority Data

Oct. 13, 2020 (KR) ........................ 10-2020-0132073

(51) Int. Cl.
*H01M 10/0569* (2010.01)
*H01M 10/0567* (2010.01)

(52) U.S. Cl.
CPC ... *H01M 10/0569* (2013.01); *H01M 10/0567* (2013.01); *H01M 2300/0028* (2013.01); *H01M 2300/0051* (2013.01)

(58) Field of Classification Search
CPC combination set(s) only.
See application file for complete search history.

(56) References Cited

U.S. PATENT DOCUMENTS 9,190,695 B2* 11/2015 Okamoto ............ H01M 10/056
10,153,490 B2* 12/2018 Ju ........................ H01M 4/525
(Continued)

FOREIGN PATENT DOCUMENTS

KR 10-2019-0092149 8/2019

*Primary Examiner* — Alexander Usyatinsky
(74) *Attorney, Agent, or Firm* — LEMPIA SUMMERFIELD KATZ LLC

(57) ABSTRACT

The electrolyte for a lithium secondary battery includes: a lithium salt; a solvent; and a functional additive, wherein the functional additive includes: at least one high-voltage additive selected from a group consisting of lithium bis(phthalato)borate, represented by the following formula 1; hexafluoroglutaric anhydride, represented by the following formula 2; and phosphoric acid tris(2,2,2-trifluoroethyl) ester, represented by the following formula 3:

[Formula 1]

(Continued)

-continued

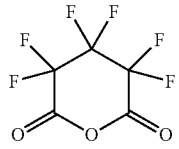

[Formula 2]

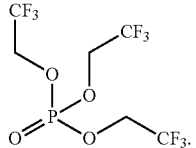

[Formula 3]

10 Claims, 3 Drawing Sheets

(56) References Cited

U.S. PATENT DOCUMENTS

| | | | |
|---|---|---|---|
| 2006/0024586 A1* | 2/2006 | Tamura | H01M 4/0421 |
| | | | 429/231.95 |
| 2011/0177399 A1* | 7/2011 | Yamaguchi | H01M 10/0567 |
| | | | 429/337 |
| 2017/0214087 A1* | 7/2017 | Yoshida | H01M 4/525 |
| 2019/0252716 A1* | 8/2019 | Tamai | H01M 4/483 |

* cited by examiner

ELECTROLYTE FOR LITHIUM SECONDARY BATTERY AND LITHIUM SECONDARY BATTERY COMPRISING SAME

CROSS REFERENCE TO RELATED APPLICATION

The present application claims priority to and the benefit of Korean Patent Application No. 10-2020-0132073, filed on Oct. 13, 2020, the entire contents of which are incorporated herein by reference.

FIELD

The present disclosure relates to an electrolyte for a lithium secondary battery and a lithium secondary battery comprising the same.

BACKGROUND

The statements in this section merely provide background information related to the present disclosure and may not constitute prior art.

A lithium secondary battery is an energy storage system comprising a positive electrode for supplying lithium ions on charge, a negative electrode for receiving lithium ions, an electrolyte serving as a lithium ion transmission mediator, a separator for separating the positive electrode and the negative electrode, wherein electric energy is generated and stored as chemical potentials change with intercalation/deintercalation in the positive and the negative electrode.

These lithium secondary batteries have been used mainly in mobile electronic devices and are now rapidly expanding their use as an energy storage system to electric vehicles (EVs) and hybrid electric vehicles (HEVs) that have been successfully commercialized therewith.

In order to increase driving ranges of EVs, studies have been focused on the increase of energy density in lithium secondary batteries. An improvement of high capacity in the positive electrode makes it possible to increase an energy density in a lithium secondary battery.

The improvement of high capacity in a positive electrode can be achieved by Ni enrichment, which is an increase of Ni content in a Ni—Co—Mn type oxide responsible for the positive electrode, or by making a high charging voltage on the positive electrode.

However, while showing high interface reactions, Ni—Co—Mn oxides in a Ni-rich state become unstable in crystal structure and undergo accelerated degradation during cycles.

The description given in the related art is only to understand the background of the present disclosure, but should not be recognized as a prior art already known to a person skilled in the art.

SUMMARY

The present disclosure provides an electrolyte for a lithium secondary battery, which can improve long-term lifetime characteristics in a lithium secondary battery, and a lithium secondary battery comprising the same.

An electrolyte for a lithium secondary battery according to one form of the present disclosure comprises a lithium salt, a solvent, and a functional additive, wherein the functional additive comprises at least one compound selected from the group consisting of lithium bis(phthalato)borate, represented by the following formula 1, as a first high-voltage additive; hexafluoroglutaric anhydride, represented by the following formula 2, as a second high-voltage additive; and phosphoric acid tris(2,2,2-trifluoroethyl)ester, represented by the following formula 3, as a third high-voltage additive:

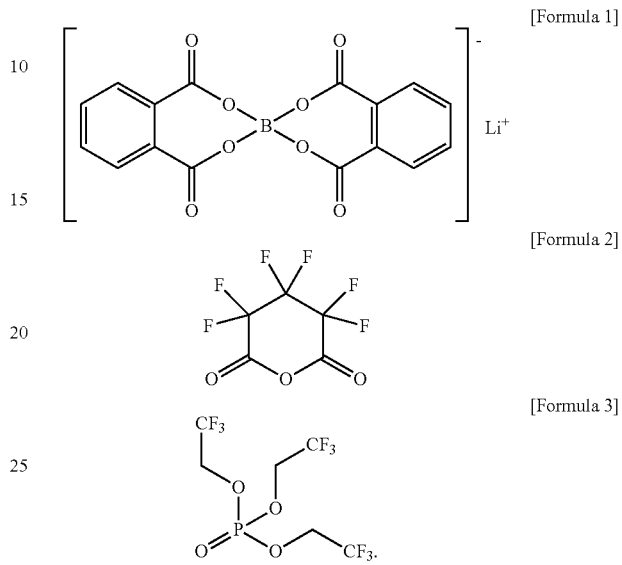

The high-voltage additive may be used in a total amount of 0.5-3.0 wt %, based on the weight of the electrolyte.

Of the high-voltage additives, the first, the second, and the third high-voltage additive may be added in an amount of 0.5-1.0 wt %, 0.25-1.0 wt %, and 0.5-1.0 wt %, respectively, based on the total weight of the electrolyte.

The functional additive may further comprise vinylene carbonate (VC) as a negative electrode film additive.

The negative electrode film additive may be added in an amount of 0.5-3.0 wt %, based on the weight of the electrolyte.

The lithium salt may be at least one compound selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbFE_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI), and $(CF_3SO_2)_2NLi$.

The solvent may be at least one substance selected from the group consisting of a carbonate-based solvent, an ester-based solvent, and a ketone-based solvent.

A lithium secondary battery according to one form of the present disclosure comprises the electrolyte described above. The lithium secondary battery may further comprise a positive electrode containing a positive electrode active material composed of Ni, Co, and Mn; a negative electrode containing at least one negative electrode active material selected from a carbon (C)-based material and silicon (Si)-based material; and a separator interposed between the positive electrode and the negative electrode.

The positive electrode may contain Ni at a content of 80 wt % or more.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
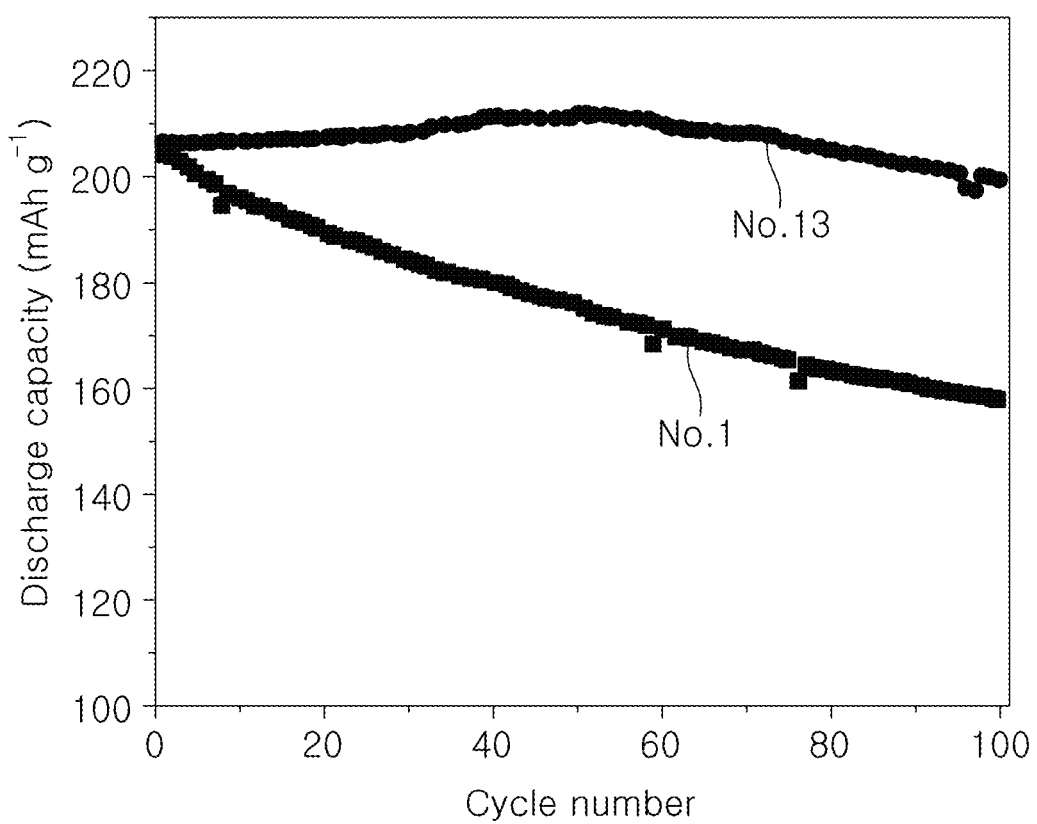
FIG. 1 is a graph showing results of charge/discharge tests in the Example and the Comparative Example.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An electrolyte for a lithium secondary battery according to one form of the present disclosure comprises a lithium salt, a solvent, and a functional additive.

The lithium salt may be at least one compound selected from the group consisting of $LiPF_F$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(CH)_4$, $Li(SO_2F)_2N(LiFSI)$, and $(CF_3SO_2)_2NLi$.

The lithium salt may exist at a total concentration of 0.1-3.0 moles in the electrolyte.

The solvent may be at least one substance selected from the group consisting of a carbonate-based solvent, an ester-based solvent, an ether-based solvent, and a ketone-based solvent.

In this regard, examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), and vinylene carbonate (VC). The ester-based solvent may be exemplified by γ-butyrolactone (GBL), n-methyl acetate, n-ethyl acetate, n-propyl acetate, etc. As the ether-based solvent, butyl ether may be used, but without limitations thereto.

In addition, the solvent may further comprise an aromatic hydrocarbonate solvent. Examples of the aromatic carbohydrate solvent include benzene, fluorobenzene, bromobenzene, chlorobenzene, cyclohexyl benzene, isopropyl benzene, n-butylbenzene, octyl benzene, toluene, xylene, and mesitylene, which may be used alone or in combination.

The functional additive used in the electrolyte according to one form of the present disclosure may comprise at least one high-voltage additive selected from the group consisting of: lithium bis(phthalato)borate, represented by the following formula 1, as a first high-voltage additive; hexafluoroglutaric anhydride, represented by the following formula 2, as a second high-voltage additive; and phosphoric acid tris(2,2,2-trifluoroethyl)ester, represented by the following formula 3, as a third high-voltage additive:

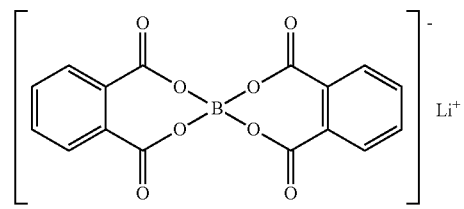

[Formula 1]

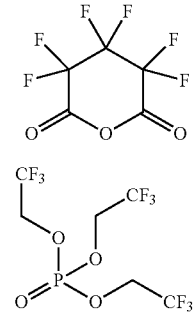

[Formula 2]

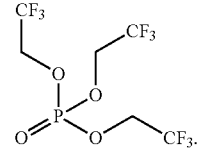

[Formula 3]

The first high-voltage additive lithium bis(phthalato)borate functions to improve oxidation stability in the electrolyte and stabilize the interface between the positive electrode and the electrolyte at high voltages. This additive may be preferably added in an amount of 0.5-1.0 wt %, based on the total weight of the electrolyte.

The second high-voltage additive hexafluoroglutaric anhydride functions to improve oxidation stability in the electrolyte and stabilize the positive electrode by forming a protective layer for protecting the surface of the positive electrode. Preferably, the second high-voltage additive may be added in an amount of 0.25-1.0 wt %, based on the total weight of the electrolyte.

Forming a thin protective layer on the surface of the positive electrode, the third high-voltage additive phosphoric acid tris(2,2,2-trifluoroethyl) ester plays a role in increasing the capacity of the lithium secondary battery. The third high-voltage additive may be preferably added in an amount of 0.5-1.0 wt %, based on the total weight of the electrolyte.

According to the present disclosure, the high-voltage additive may be added in a total amount of 0.5-3.0 wt %, based on the total weight of the electrolyte.

When added in an amount less than 0.5 wt %, the high-voltage additive contributes only little effects because it little improves oxidation stability in the electrolyte and cannot sufficiently form a surface protecting layer. More than 3.0 wt % of the high-voltage additive causes the excessive formation of a surface protecting layer, increasing a cell resistance, which results in a decreased lifetime.

Meanwhile, the functional additive may further comprise a negative electrode film additive functioning to form a film on a negative film. For example, vinylene carbonate (VC) may be used as the negative electrode film additive.

The negative electrode film additive may be preferably added in an amount of 0.5-3.0 wt %, based on the weight of the electrolyte. More preferably, the negative electrode film additive may be added in an amount of 1.5-2.5 wt %.

Less than 0.5 wt % of the negative electrode film additive reduces long-term lifetime characteristics of the cell. When exceeding 3.0 wt %, the amount of the negative electrode film additive excessively forms a surface protecting layer causes increased cell resistance, resulting in a reduction in battery output.

According to one form thereof, the present disclosure provides a lithium secondary battery comprising the electrolyte described above, a positive electrode, a negative electrode, and a separator.

The positive electrode includes an NCM-based positive electrode active material composed of Ni, Co, and Mn. Particularly, the positive electrode active material in the positive electrode according to one form is composed only of an NCM-based positive electrode active material containing 80 wt % or more of Ni.

The negative electrode includes at least one substance selected from carbon (C)- and silicon (Si)-based negative electrode active materials.

The carbon (C)-based negative electrode active material may be at least one material selected from the group consisting of artificial graphite, natural graphite, graphitized carbon fibers, graphitized mesocarbon microbeads, fullerene, and amorphous carbon.

The silicon (Si)-based negative electrode active material may include a silicon oxide, a silicon particle, and a silicon alloy particle.

For the positive electrode and the negative electrode, the corresponding active material is mixed with a conductive material, a binder, and a solvent to prepare an electrode slurry. This electrode slurry is applied directly on a current collector and dried to manufacture the positive electrode or the negative electrode. In this regard, the current collector may be formed of aluminum (Al), but with no limitations thereto. Such electrode manufacturing methods are well known in the art and thus a detailed description is not given thereof.

The binder acts to well aggregate active material particles each other or strongly attach them to a current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-bearing polymers, polyvinyl pyrrolidone, polyurethane, polytetrafluoroethylene, polyvinylidene fluoride, polyethylene, polypropylene, styrene butadiene rubber, acrylated styrene butadiene rubber, an epoxy resin, and nylon.

The conductive material is used to confer conductivity on the electrodes. So long as it is of electron conductivity without causing a chemical change in the battery, any conductive material is available. Examples of the conductive material include natural graphite, artificial graphite, carbon black, acetylene black, Ketjenblack, carbon fibers, and metal particles or fibers such as copper, nickel, aluminum, silver, etc. In addition, at least one conductive material such as a polyphenylene derivative may be further used.

The separator inhibits the formation of a short circuit between the positive electrode and the negative electrode while providing migration channels of lithium ions. This separator may well-known one, for example, a polyolefinic membrane such as polypropylene, polyethylene, polyethylene/polypropylene, polyethylene/polypropylene/polyethylene, polypropylene/polyethylene/polypropylene, etc., or a multiple membrane, microporous film, woven fabric, or non-woven fabric thereof. Alternatively, a porous polyolefin film coated with highly stable resin may be used.

Hereinafter, the present disclosure is explained with reference to Examples and Comparative Examples.

<Experiment 1> Charge/Discharge Characteristic (Full Cell) at High Temperature According to Type and Amount of Functional Additive To examine charge/discharge characteristics according to types and amounts of functional additives used in an electrolyte, a measurement was made of initial capacity and capacity retention after 100 cycles at a high temperature (45° C.) while types and amounts of functional additives were changed as shown in Table 1, below. The results are summarized in Table 1 and depicted in FIG. 1. The positive electrode surfaces were observed after 100 cycles in order to examine the protective effects of the functional additives on the positive electrode surfaces, and the results are given in FIG. 2.

In this regard, charge/discharge cycles were performed under the condition 2.7-4.35V @ 0.1 C 2Cyc+1 C, 45° C. For preparing electrolytes, 0.5M $LiPF_6$+0.5 LiFSI was used as a lithium salt and a mixture of ethylene carbonate (EC):ethylmethyl carbonate (EMC):diethyl carbonate (DEC) at a volume ratio of 25:45:30 was used as a solvent.

The positive electrode was made of NCM811 while the negative electrode was a graphite electrode.

TABLE 1

| No. | | VC | Additive $1^{st}$ | $2^{nd}$ | $3^{rd}$ | Initial Capa. @1 C $1^{st}$ cyc (mAh/g) | Capa. Retention @1 C 100 cyc (%) |
|---|---|---|---|---|---|---|---|
| 1 | C. Ex. | 2.0 | — | — | — | 204 | 77.2 |
| 2 | Ex. | 2.0 | 1.0 | — | — | 202 | 90.0 |
| 3 | Ex. | 2.0 | — | 0.25 | — | 186 | 78.7 |
| 4 | Ex. | 2.0 | — | — | 0.5 | 214 | 78.1 |
| 5 | Ex. | 2.0 | 1.0 | 1.0 | — | 160 | 91.3 |
| 6 | Ex. | 2.0 | 0.5 | — | 0.5 | 182 | — |
| 7 | Ex. | 2.0 | 1.0 | — | 1.0 | 192 | 85.3 |
| 8 | C. Ex. | 2.0 | 2.0 | — | 2.0 | 198 | 76.1 |
| 9 | C. Ex. | 2.0 | 0.5 | 0.1 | 2.0 | 165 | 75.8 |
| 10 | Ex. | 2.0 | 0.5 | 0.25 | 0.5 | 185 | 100.0 |
| 11 | Ex. | 2.0 | 1.0 | 0.5 | 1.0 | 184 | 92.0 |
| 12 | Ex. | 2.0 | 1.0 | 1.0 | 1.0 | 165 | 94.4 |
| 13 | Ex. | 2.0 | 1.0 | 0.25 | 0.5 | 206 | 94.1 |

First, as can be seen in Table 1 and FIG. 1, improved capacity retention rates were obtained when the conventional function additive VC is used in combination with various types and amounts of the high-voltage additives according to the present disclosure (Nos. 2-7 and 10-13) than alone (No. 1).

Particularly, Nos. 10 to 13 in which the first high-voltage additive, the second high-voltage additive, and the third high-voltage additive were all added within the ranges proposed in the present disclosure exhibited significant improvements in capacity retention.

In contrast, Nos. 8 and 9 in which the amounts of the high-voltage additive according to the present disclosure departed from the proposed range were lower in capacity retention than No. 1.

Therefore, although an improvement in capacity retention is expected by adding one or two among the first high-voltage additive, the second high-voltage additive, and the third high-voltage additive, it is desirable to add all of the three additives within the proposed ranges.

Figure 2:
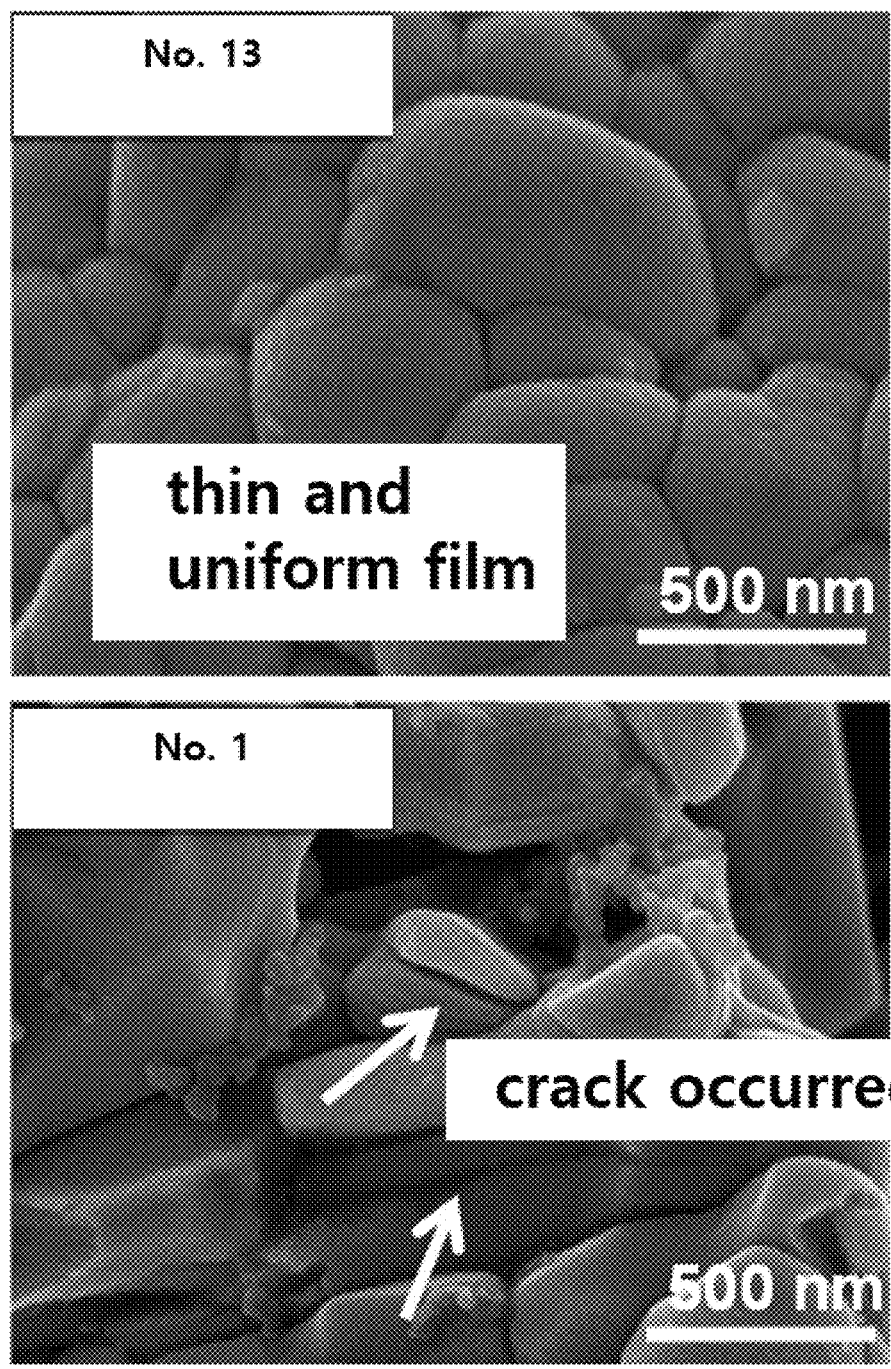
FIG. 2 shows images of the positive electrode surfaces of the Example and the Comparative Example after charge/discharge cycles.

As shown in FIG. 2, cracks were generated on the surface of the positive electrode in No. 1 after 100 cycles.

For No. 13, no cracks were found after 100 cycles and a thin and uniform film was maintained on the surface of the positive electrode.

Therefore, the addition of the functional additive is considered to allow the formation of a uniform film that serves as a protective film on the positive electrode and the maintenance of the uniform film after 100 cycles, thus improving capacity retention.

<Experiment 2> Assay for Transition Metal Elution in Electrolyte According to Electrolyte Composition after High-Temperature Storage Elution of transition metals in electrolytes according to electrolyte composition was examined by inductive-coupled plasma-mass spectroscopy (ICP-MS). The results are summarized in Table 2, below.

Experiments were conducted with Nos. 1 and 13. In this regard, NCM811 and graphite were used for the positive and the negative electrode, respectively, the lithium salt for the electrolytes was 0.5M $LiPF_6$+0.5 LiFSI, and a mixture of ethylene carbonate (EC):ethylmethyl carbonate (EMC):diethyl carbonate (DEC) at a volume ratio of 25:45:30 was used as a solvent. After being stored at 45° C. for 14 days, full cells 4.35V(SOC100) were measured for transition metals eluted in the electrolytes.

TABLE 2

| No. | | Transition metal eluted (ppb) | | |
|---|---|---|---|---|
| | | Ni | Co | Mn |
| 1 | C. Ex. | 4.14 | 0.57 | 0.85 |
| 13 | Ex. | 2.26 | 0.14 | 0.23 |

As can be seen in Table 2, transition metal elution was remarkably reduced for the Example (No. 130, compared to the Comparative Example (No. 1).

Figure 3:
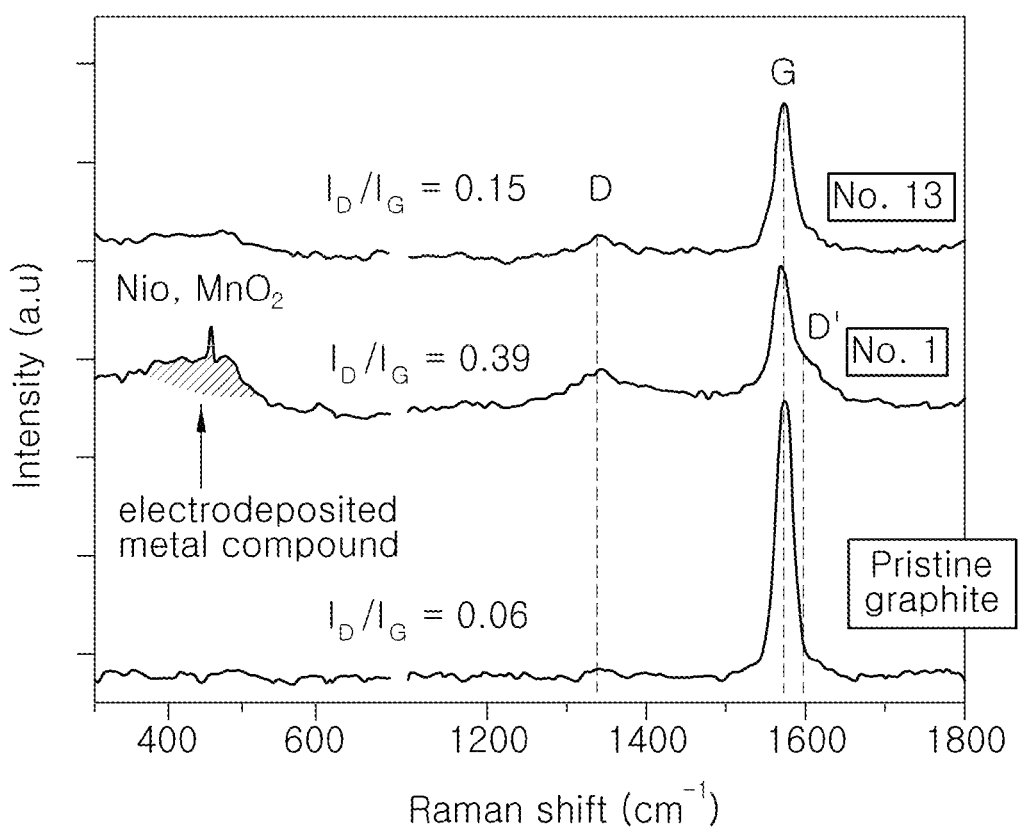
FIG. 3 is a view showing results of transition metal deposition tests on graphite negative electrodes of the Example and the Comparative Example after high-temperature storage.

<Experiment 3> Assay for Electrodeposition of Transition Metal on Negative Electrode According to Electrolyte Composition after High Temperature Storage Extents of electrodeposition of transition metals on the graphite negative electrode were measured through an experiment (Raman), and the results are depicted in FIG. 3.

The experiment was carried out for Nos. 1 and 13. In this regard, NCM811 and graphite were used for the positive and the negative electrode, respectively.

Charge/discharge cycles were carried out under the condition: 2.7-4.35V @ 0.1 C 2Cyc+1 C, 45° C. The lithium salt for the electrolytes was 0.5M $LiPF_6$+0.5 LiFSI, and a mixture of ethylene carbonate (EC):ethylmethyl carbonate (EMC):diethyl carbonate (DEC) at a volume ratio of 25:45:30 was used as a solvent.

As can be seen in FIG. 3, electrodeposited metal compounds were not detected in No. 13, but in No. 1.

As described hitherto, according to various forms of the present disclosure, when employing a high-voltage additive therein, an electrolyte can secure oxidation stability at a voltage as high as 4.4 V thereof and thus suppresses side reactions at high voltages, with the resultant improvement of lifetime in the lithium secondary battery.

In addition, the electrolyte can suppress the degradation on the surface of the positive electrode and improve film stability in the negative electrode, thereby extending the lifetime of the lithium secondary battery.

Furthermore, the electrolyte improves lifetime stability at high temperatures and high voltages, thereby contributing to an improvement of commercial value in the battery.

It will be appreciated by those having ordinary knowledge in the art to which the present disclosure pertains that the present disclosure may be practiced in other specific forms without changing the technical spirit and essential features of the present disclosure. Therefore, it should be understood that various forms described above are illustrative but not restrictive in all aspects. The scope of the present disclosure is defined by the scope of the attached claims, rather than the detailed description. It should be appreciated that all variations and modifications derived from the scope of the claims and the equivalent concepts thereof are included in the scope of the present disclosure.

What is claimed is:

1. An electrolyte for a lithium secondary battery, the electrolyte comprising:
   a lithium salt;
   a solvent; and
   a functional additive,
   wherein the functional additive comprises: lithium bis (phthalato)borate, represented by the following formula 1; hexafluoroglutaric anhydride, represented by the following formula 2; and phosphoric acid tris(2,2, 2-trifluoroethyl)ester, represented by the following formula 3:

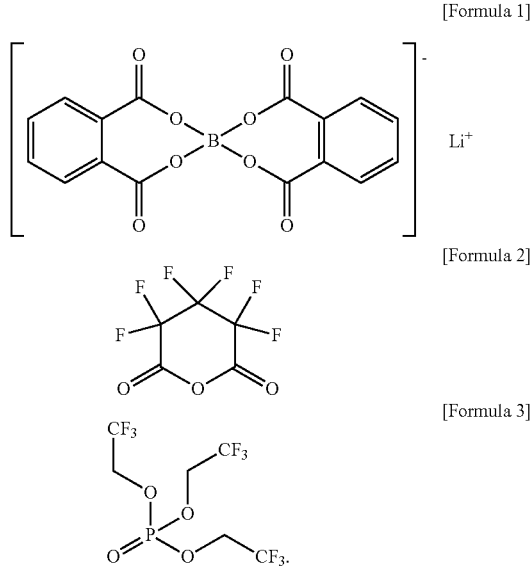

2. The electrolyte of claim 1, wherein the functional additive is added in a total amount of 0.5-3.0 wt %, based on a total weight of the electrolyte.

3. The electrolyte of claim 1, wherein the electrolyte comprises:
   0.5-1.0 wt % of the lithium bis(phthalato)borate,
   0.25-1.0 wt % of the hexafluoroglutaric anhydride, and
   0.5-1.0 wt % of the phosphoric acid tris(2,2,2-trifluoroethyl)ester, based on a total weight of the electrolyte.

4. The electrolyte of claim 1, wherein the functional additive further comprises vinylene carbonate (VC).

5. The electrolyte of claim 4, wherein the vinylene carbonate (VC) is added in an amount of 0.5-3.0 wt %, based on a total weight of the electrolyte.

6. The electrolyte of claim 1, wherein the lithium salt comprises LiPF$_6$, LiBF$_4$, LiClO$_4$, LiCl, LiBr, LiI, LiB$_{10}$Cl$_{10}$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiN(SO$_2$C$_2$F$_5$)$_2$, Li(CF$_3$SO$_2$)$_2$N, LiC$_4$F$_9$SO$_3$, LiB(C$_6$H$_5$)$_4$, Li(SO$_2$F)$_2$N (LiFSI), (CF$_3$SO$_2$)$_2$NLi, or a combination thereof.

7. The electrolyte of claim 1, wherein the solvent comprises a carbonate-based solvent, an ester-based solvent, an ether-based solvent, a ketone-based solvent, or a combination thereof.

8. A lithium secondary battery comprising:
an electrolyte comprising:
a lithium salt;
a solvent; and
a functional additive,
wherein the functional additive comprises: lithium bis(phthalato)borate, represented by the following formula 1; hexafluoroglutaric anhydride, represented by the following formula 2; and phosphoric acid tris(2,2,2-trifluoroethyl)ester, represented by the following formula 3:

[Formula 1]

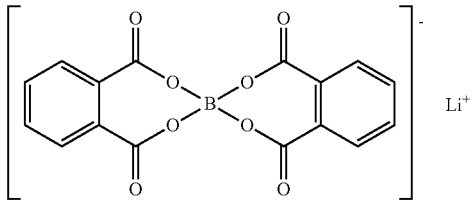

[Formula 2]

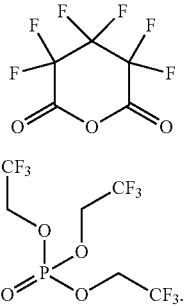

[Formula 3]

9. The lithium secondary battery of claim 8, further comprising:
a positive electrode containing a positive electrode active material comprising Ni, Co, and Mn;
a negative electrode containing at least one negative electrode active material comprising a carbon (C)-based material or silicon (Si)-based material; and
a separator interposed between the positive electrode and the negative electrode.

10. The lithium secondary battery of claim 8, wherein the electrolyte comprises:
0.5-1.0 wt % of the lithium bis(phthalato)borate,
0.25-1.0 wt % of the hexafluoroglutaric anhydride, and
0.5-1.0 wt % of the phosphoric acid tris(2,2,2-trifluoroethyl)ester, based on a total weight of the electrolyte.

* * * * *